United States Patent [19]

Mott

[11] Patent Number: 4,771,643
[45] Date of Patent: Sep. 20, 1988

[54] SPRING RETURN FOR MOTOR DRIVEN LOADS

[75] Inventor: Richard C. Mott, Harwood Heights, Ill.

[73] Assignee: Honeywell Inc., Minneapolis, Minn.

[21] Appl. No.: 377,777

[22] Filed: May 13, 1982

[51] Int. Cl.[4] .............................................. G05G 17/00
[52] U.S. Cl. .......................................... 74/2; 74/106;
 74/424.8 VA; 74/520; 251/69; 403/85
[58] Field of Search ............... 74/2, 106, 424.8 VA,
 74/520; 251/69; 403/31, 85; 200/153 G

[56] References Cited

U.S. PATENT DOCUMENTS

| | | | |
|---|---|---|---|
| Re. 30,135 | 11/1979 | Fitzwater | 74/2 |
| 695,724 | 3/1902 | Herman | 74/2 |
| 927,541 | 7/1909 | Hubbard | |
| 1,477,641 | 12/1923 | Francis | |
| 1,525,024 | 2/1925 | Carrier | |
| 1,542,341 | 6/1925 | Deckert | 74/502 X |
| 1,653,220 | 12/1927 | Loucks | |
| 1,693,273 | 11/1928 | Hankison et al. | |
| 2,026,347 | 12/1935 | Johnson | 74/106 |
| 2,052,929 | 9/1936 | Kronmiller | 137/139 |
| 2,369,362 | 2/1945 | Marziani | 74/106 X |
| 2,974,742 | 3/1961 | Tyler | 180/82 |
| 3,094,004 | 6/1963 | Berck | 74/2 |
| 3,358,207 | 12/1967 | Natho | 251/69 X |
| 3,788,596 | 1/1974 | Maeda | 251/69 |
| 4,119,118 | 10/1978 | Patel | 403/31 X |

Primary Examiner—Allan D. Herrmann
Attorney, Agent, or Firm—Donald J. Lenkszus

[57] ABSTRACT

A load return mechanism is provided having an actuator for driving a load, a load adapted to be driven by the actuator, a first lever driven by the actuator, a second lever attached to the load, and an apparatus for locking the two levers together so that the load can be driven by the actuator and for unlocking the two levers to return the load to a predetermined position upon power interruption.

12 Claims, 2 Drawing Sheets

SPRING RETURN FOR MOTOR DRIVEN LOADS

BACKGROUND OF THE INVENTION

The present invention relates to a load return mechanism for returning a load to a predetermined position upper power interruption and, more particularly, to a load return mechanism for returning a load to a predetermined position upon power interruption in which the motor driving the load does not have to operate against the load return mechanism during normal operation of the system.

In the control of various loads such as valves and dampers, it has become the practice to bias the load such that upon power failure the load will be driven to a predetermined position. Prior art arrangements merely relied upon a return spring for normally biasing the load opened or closed, whichever was preferred. However, whenever the actuator, such as a motor, operated the load to a different position, the actuator had to operate against the return spring. Thus, the size of the actuator necessary to operate successfully against the force exerted by the return spring on the actuator as well as the nonlinear relationship between the force that the motor had to exert against the spring as a function of the input to the motor both had to be considered. The present invention substantially eliminates force considerations while still providing a spring return to drive the load to a predetermined position upon power interruption or power removal.

SUMMARY OF THE INVENTION

A load return mechanism is provided having an actuator for driving a load, a first lever driven by the actuator, a second lever attached to the load, and a locking-unlocking return device for locking the two levers together so that the load can be driven by the motor and for unlocking the levers to return the load to a predetermined position upon power interruption.

Since the two levers are locked together during normal operation, the actuator is not required to drive the load against the return spring and thus the force that the return device will exert upon power interruption does not affect the operation of the motor during normal operation. However, the two levers are unlocked during power interruption such that the return device is allowed to return the load to a predetermined position upon power interruption.

BRIEF DESCRIPTION OF THE DRAWINGS

These and other features and advantages will become more apparent from a detailed consideration of the invention when taken in conjunction with the drawings in which.

DETAILED DESCRIPTION

Figure 1:
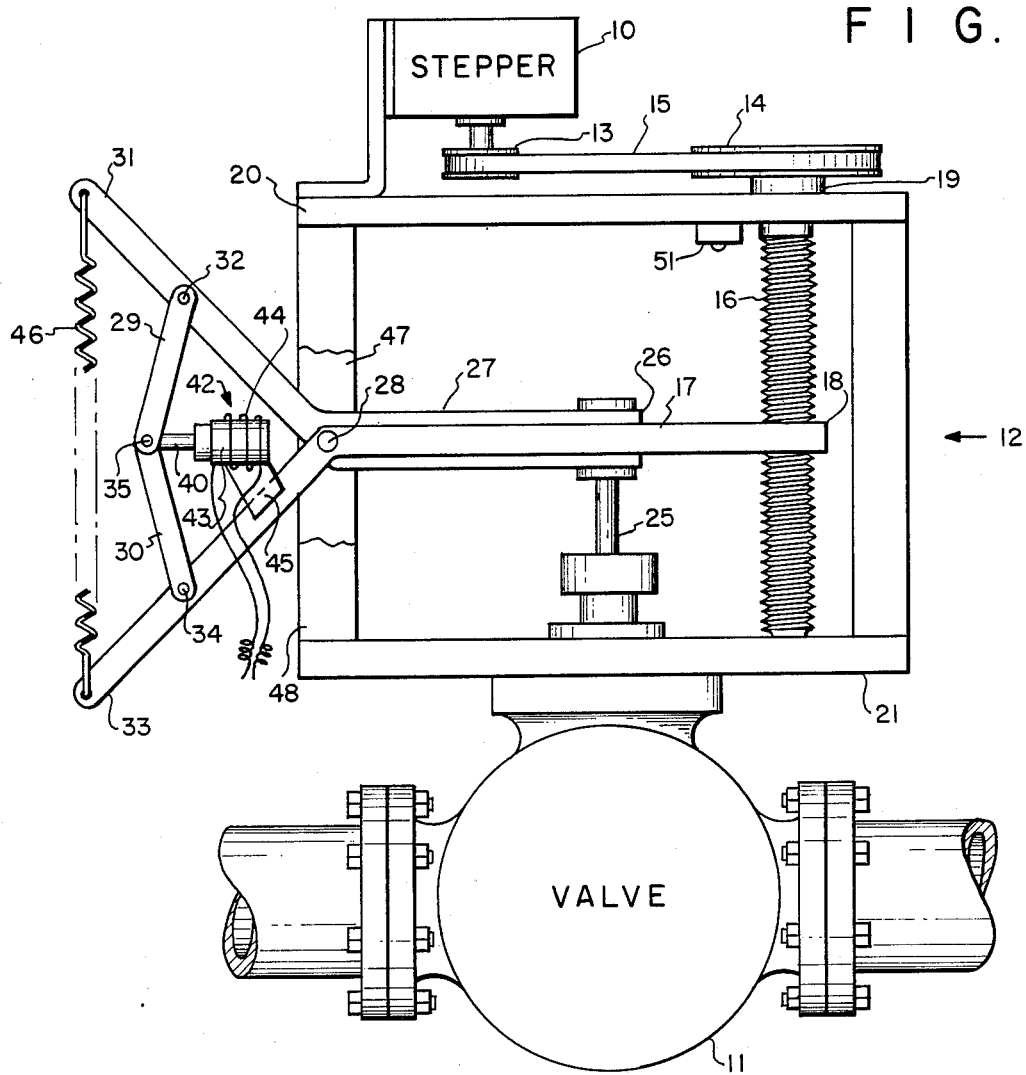
FIG. 1 is an illustration of a stepper motor driving a valve load through the lever and return mechanism of the instant invention.

FIG. 1 shows one form of the invention in which stepper motor 10 positions the valve operator of valve 11 through load return mechanism 12. Thus, stepper motor 10 drives an output friction gear 13 which in turn rotates pulley 14 by use of belt 15. As pulley 14 rotates, screw 16 rotates and lever 17, having first end 18 in the form of a nut, moves up or down depending upon the direction of rotation of screw 16. Because first end 18 is in the form of a nut, lever 17 will be displaced as screw 16 rotates. Screw 16 is supported at one end by bearing 19 suitably supported by plate 20 and can be supported at the other end in plate 21 by another suitable bearing (not shown).

Valve 11 also is supported by lower plate 21 and has a valve operator 25 suitably attached to first end 26 of second lever 27. Levers 17 and 27 are pivoted with respect to one another about pivot point 28. During normal operation, toggle link 29 and toggle link 30 are used to lock the two levers 17 and 27 together.

Figure 5:
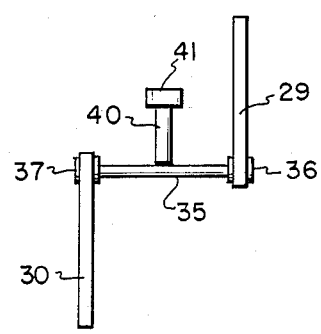
FIG. 5 shows one arrangement for the pivot 35 of FIGS. 1 and 4.

As shown, toggle link 29 is pivotally secured to second end 31 of lever 27 by pivot 32 and toggle link 30 is pivotally supported to second end 33 of lever 17 by pivot 34. Toggle links 29 and 30 are pivotally connected to one another by a pivot arm 35 which is shown in more detail in FIG. 5. Pivot arm 35 is attached to toggle link 29 by pivot 36 and toggle link 30 is connected to pivot arm 35 by pivot 37. Also connected to pivot arm 35 is locking arm 40 having a locking plate 41 mounted on the end thereof. Locking plate 41 cooperates with electromagnet 42 for locking toggle links 29 and 30 together so that levers 17 and 27 move in unison. Electromagnet 42 is comprised of core or armature 43 and coil 44 supported by bracket 45 to lever 27. Also connected to second ends 31 and 33 of levers 27 and 17 is a return spring 46 which tends to bias second ends 31 and 33 toward each other.

Levers 17 and 27 are guided up and down by brackets 47 behind the levers and 48 in front of the levers.

Thus, in this arrangement, whenever stepper motor 10 receives stepping pulses, it rotates gear 13, belt 15 and pulley 14 for rotating screw 16. As screw 16 rotates, nut end 18 of lever 17 will move lever 17. Because coil 44 is energized any time power is supplied to it, lock plate 41 and armature 43 are locked together which locks toggle links 29 and 30 in a position to spread ends 31 and 33 and thus lever 27 moves with lever 17. If power is interrupted to coil 44, locking plate 41 and armature 43 are no longer magnetically locked together and toggle links 29 and 30 are free to pivot about both ends 31 and 33 of levers 27 and 17 but also with respect to themselves about pivot arm 35. Spring 46 will then pull ends 31 and 33 together. However, because lever 17 is still fixed to screw 16, end 26 of lever 27 is forced upwards which operates through valve operator 25 to open valve 18. As can be seen, this load return mechanism 12 can be arranged for driving valve 11 to a predetermined closed position if that is desired.

In order to lock levers 17 and 27 together again once power is resumed, screw 16 is rotated by stepper motor 10 be begin driving lever 17 upwards. At some point, lever 27 will first contact plate 20 and will move no further. At a further point, arm 17 will contact stop and/or limit switch 51 which is sized so that, at the instant of contact, levers 17 and 27 are parallel. At this point, locking plate 41 and armature 43 are magnetically locked together and valve 11 can thereafter be controlled by stepper motor 10.

Figure 2:
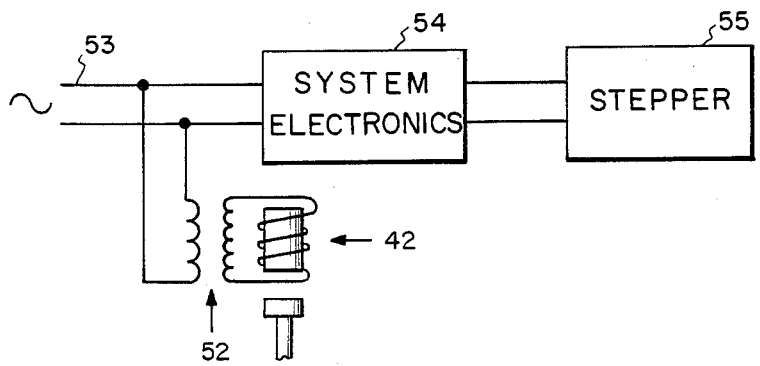
FIG. 2 shows how the electromagnetic locking and unlocking arrangement in FIG. 1 is powered from the power supply.
Figure 3:
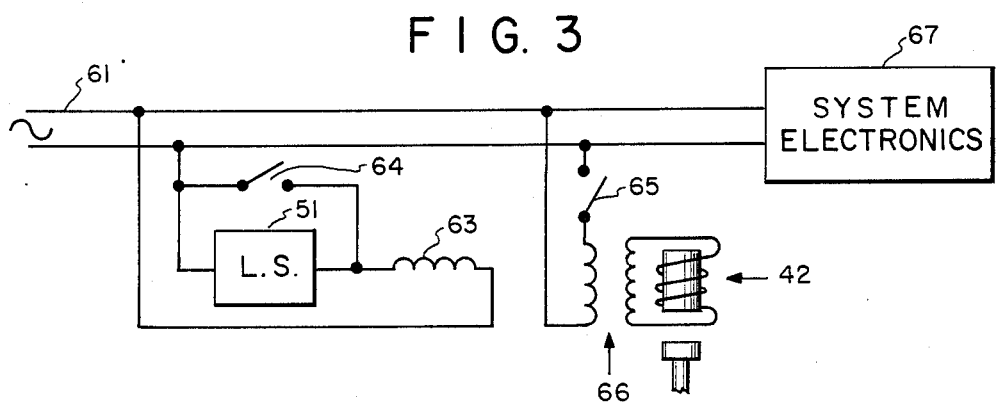
FIG. 3 shows an alternative arrangement for powering the electromagnetic arrangement for locking and unlocking the levers of FIG. 1.

FIGS. 2 and 3 show alternative forms for controlling electromagnet 42. FIG. 2 is the simplest form and merely involves a transformer 52, if necessary, for stepping down voltage from supply lines 53 to electromagnet 42 which may be a low voltage device. In this case, electromagnet 42 is energized whenever power is supplied to lines 53. Thus, when power is interrupted, levers 17 and 27 are unlocked. When power resumes, stepper motor 10 will drive lever 17 upwards until at some point the magnetic attraction between armature 43 and locking plate 41 is strong enough to lock levers 17 and 27 together. Also connected to power lines 53 is the System Electronics 54 which is designed to provide stepping pulses to stepper motor 55 in order to control valve 11.

In a more complex form as shown in FIG. 3, power lines 61 are connected through limit switch 51 to relay 63. Relay 63 has two sets of contacts. First set of contacts 64 are designed so that when relay 63 is energized through the operation of limit switch 62, contact 64 will close to maintain relay 63 energized. Relay 63 also has a second set of contacts 65 which connect power lines 61 to transformer 66 for supplying step down voltage to electromagnet 42. Thus, upon power up, stepper motor 10 will be driven through System Electronics 67 to a point where lever 17 will operate limit switch 51. When limit switch 51 is operated, relay 63 is energized to close contact 64 for maintaining relay 63 energized and contact 65 for energizing electromagnet 42. At this point, levers 17 and 27 are now locked together. As stepper motor 10 steps lever 17 away from limit switch 51, limit switch 51 will open but because contacts 64 are closed relay 63 will be maintained energized. Upon power failure, relay 63 is deenergized opening up contacts 64 and 65 and power is no longer supplied to electromagnet 42 which unlocks arm 17 and 27.

Figure 4:
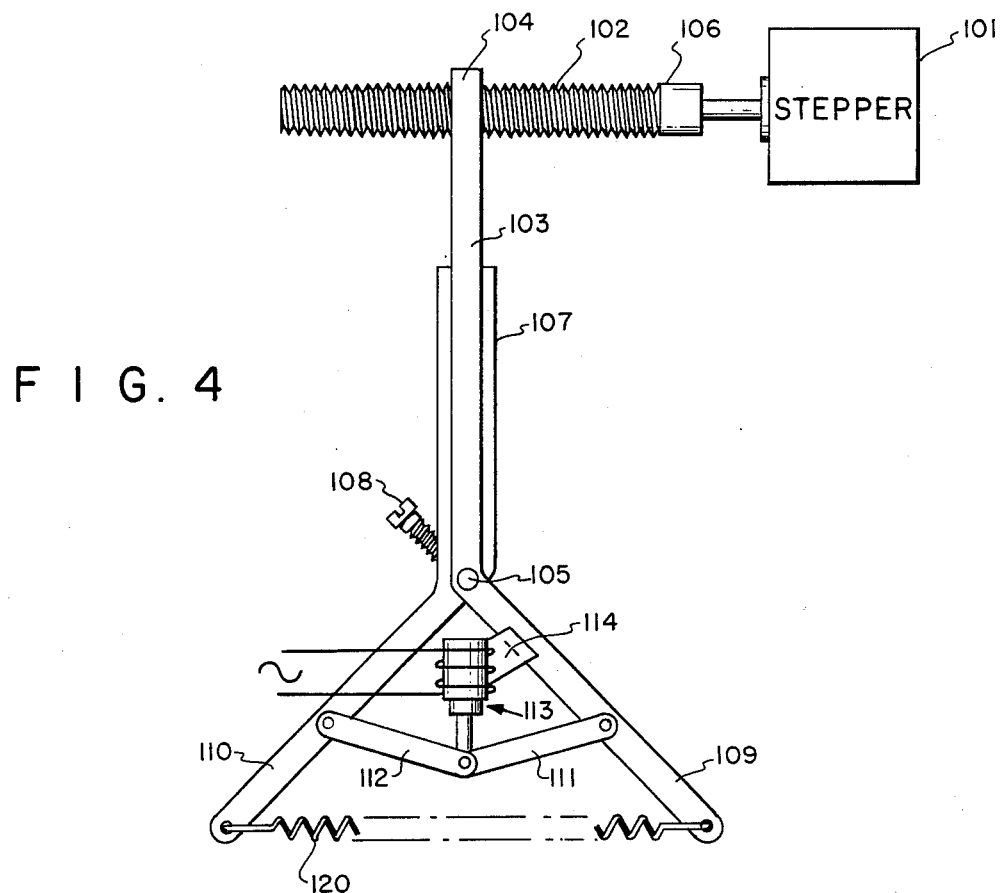
FIG. 4 shows a return arrangement used in connection with a damper.

FIG. 4 shows an arrangement for driving a damper. In this case, stepper 101 drives screw 102 through universal joint 106. Lever 103 has a threaded hole at end 104 forming a nut which causes lever 103 to be rotated about axis 105 which is the damper axle. U-joint 106 absorbs any forces on screw 102 caused by rotation of lever 103.

Lever 103 is loosely supported by damper axle 105 so that it is not the lever 103 itself which causes the damper axle to rotate. However, lever 107 is affixed to damper axle 105 by set screw 108 and bacause levers 103 and 107 are locked together, rotation of lever 103 will also rotate lever 107 and will thus rotate the damper axle bacause of setscrew 108. The second ends 109 and 110 of levers 103 and 107 respectively are attached to toggle links 111 and 112 which are attached to each other in a manner similar to that shown in FIG. 5. Thus, toggle link 111 is connected to end 109 by a pivot joint and similarly toggle link 112 is connected to second end 110 by a pivot point. Electromagnet 113 is connected to the power lines and is supported by bracket 114 to second end 109 and is used to lock toggle links 111 and 112, and thus levers 103 and 107, together in a manner similar to FIG. 1.

In FIG. 4, as stepper motor 101 rotates screw 102, lever 103 is rotated about axis 105. Because levers 103 and 107 are locked together, lever 107 rotates. Because of setscrew 108, lever 107 rotates the damper axle which adjusts the opening of the damper. When power to electromagnet 113 is interrupted, toggle links 111 and 112 unlock levers 103 and 107. Because lever 103 is fixed to screw 102, return spring 120 will cause lever 107 to rotate and thereby rotate damper axle 105 to operate the damper connected to damper axle 105 to a predetermined position.

The embodiments of the invention in which an exclusive property or right is claimed are defined as follows:

1. A load return mechanism comprising:
    a motor supplied with power for driving said load;
    a first lever having a first end to be driven by said motor and a second end;
    a second lever having a first end attached to said load and a second end; and,
    lock-unlock means connected between said second ends of said first and second levers for locking said two levers spatially together so that said load can be driven by said motor and for unlocking said levers upon power interruption so that said second ends can spatially move with respect to one another for returning said load to a predetermined position upon power interruption.

2. The mechanism of claim 1 wherein said lock-unlock means comprises return means connected between said second ends of said first and second levers for returning said load to said predetermined position upon power interruption.

3. The mechanism of claim 2 wherein said lock-unlock means comprises a first toggle link pivotally connected to said first lever, a second toggle link pivotally connected to said second lever, said first and second toggle links pivotally connected with respect to one another, and electromagnet means supplied with power for locking said two toggle links together when said power is supplied to said locking-unlocking means and for unlocking said first and second toggle links when power is interrupted.

4. The mechanism of claim 3 wherein said return means comprises a spring connected between said first and second levers.

5. A load return mechanism comprising:
    an actuator supplied with power for driving a load;
    a load adapted to be driven by the actuator;
    a first lever driven by said actuator;
    a second lever attached to said load; and
    means for locking said two levers together so that said load can be driven by said actuator and for unlocking said levers to return said load to a predetermined position upon power interruption;
    wherein said means comprises lock-unlock means connected between said two levers for locking and unlocking said two levers together and return means connected between said first and second levers for biasing said first and second levers with respect to one another so that upon power interruption said return means will cause said second lever to return said load to said predetermined position;
    said lock-unlock means comprises a first toggle link pivotally connected to said first lever, a second toggle link pivotally connected to said second lever, said first and second toggle links pivotally connected with respect to one another, and electromagnet means supplied with power for locking said two toggle links together when said power is supplied to said locking-unlocking means and for unlocking said first and second toggle Links when power is interrupted.

6. The mechanism of claim 5 wherein said return means comprises a spring connected between said first and second levers.

7. A load return mechanism comprising:
an actuator supplied with power for driving a load;
a load adapted to be driven by the actuator;
a first lever driven by said actuator;
a second lever attached to said load; and
means for locking said two levers together so that said load can be driven by said actuator and for unlocking said levers to return said load to a predetermined position upon power interruption;
wherein said first lever has a first end driven by said actuator and a second end, said second lever has a first end attached to said load and a second end, said first and second levers being pivoted with respect to one another;
wherein said means comprises lock-unlock means connected between said two levers for locking and unlocking said two levers together and return means connected between said second ends of said first and second levers for biasing said first and second levers with respect to one another so that upon power interruption said return means will cause said second lever to return said load to said predetermined position;
said lock-unlock means comprises a first toggle link pivotally connected to said second end of said first lever, a second toggle link pivotally connected to said second end of said second lever, said first and second toggle links pivotally connected with respect to one another, and electromagnet means supplied with power for locking said two toggle links together when said power is supplied to said locking-unlocking means and for unlocking said first and second toggle links when power is interrupted.

8. The mechanism of claim 7 wherein said return means comprises a spring connected between said second ends of said first and second levers.

9. A load return mechanism for returning a load, which is driven by an electrical motor, to a predetermined position upon electrical power interruption comprising:
a first lever adapted to be driven by said motor;
a second lever adapted to be attached to said load; and
means for locking said two levers together so that said load can be driven by said motor and for unlocking said levers to allow said load to be returned to a predetermined position upon electrical power interruption;
wherein said means comprises lock-unlock means connected between said two levers for locking and unlocking said two levers together and return means connected between said first and second levers for biasing said first and second levers with respect to one another so that upon power interruption said return means will cause said second lever to return said load to said predetermined position;
said lock-unlock means comprises a first toggle link pivotally connected to said first lever, a second toggle link pivotally connected to said second lever, said first and second toggle links pivotally connected with respect to one another, and electromagnet means supplied with power for locking said two toggle links together when said power is supplied to said locking-unlocking means and for unlocking said first and second toggle links when power is interrupted.

10. The mechanism of claim 9 wherein said return means comprises a spring connected between said first and second levers.

11. A load return mechanism for returning a load, which is driven by an electrical motor, to a predetermined position upon electrical power interruption comprising:
a first lever adapted to be driven by said motor;
a second lever adapted to be attached to said load; and
means for locking said two levers together so that said load can be driven by said motor and for unlocking said levers to allow said load to be returned to a predetermined position upon electrical power interruption;
wherein said first lever has a first end adapted to be driven by said motor and a second end, said second lever has a first end adapted to be attached to said load and a second end, said first and second levers being pivoted with respect to one another;
wherein said means comprises lock-unlock means connected between said two levers for locking and unlocking said two levers together and return means connected between said second ends of said first and second levers for biasing said first and second levers with respect to one another so that upon power interruption said return means will cause said second lever to return said load to said predetermined position;
said lock-unlock means comprises a first toggle link pivotally connected to said second end of said first lever, a second toggle link pivotally connected to said second end of said second lever, said first and second toggle links pivotally connected with respect to one another, and electromagnet means supplied with power for locking said two toggle links together when said power is supplied to said locking-unlocking means and for unlocking said first and second toggle links when power is interrupted.

12. The mechanism of claim 11 wherein said return means comprises a spring connected between said first and second levers.

* * * * *